(12) United States Patent
Ozawa (10) Patent No.: US 8,378,784 B2
(45) Date of Patent: Feb. 19, 2013

(54) PROJECTION SYSTEM, SCREEN, AND PROJECTOR

(75) Inventor: Takashi Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 12/607,273

(22) Filed: Oct. 28, 2009

(65) Prior Publication Data

US 2010/0123545 A1 May 20, 2010

(30) Foreign Application Priority Data

Nov. 17, 2008 (JP) ................................. 2008-293067

(51) Int. Cl.
G05B 19/00 (2006.01)

(52) U.S. Cl. ............................ 340/5.8; 340/2.1; 345/504

(58) Field of Classification Search .................... 340/5.8; 345/504

See application file for complete search history.

(56) References Cited

U.S. PATENT DOCUMENTS

| 6,483,555 | B1 * | 11/2002 | Thielemans et al. ........... 348/745 |
| 7,918,566 | B2 * | 4/2011 | Abe ................................. 353/94 |
| 2003/0020881 | A1 * | 1/2003 | Jung et al. ....................... 353/30 |
| 2004/0140982 | A1 * | 7/2004 | Pate ................................ 345/600 |
| 2005/0120096 | A1 | 6/2005 | Rekimoto et al. |
| 2008/0039063 | A1 * | 2/2008 | Ichieda .......................... 455/420 |
| 2009/0231270 | A1 * | 9/2009 | Vartiainen et al. ............. 345/156 |

FOREIGN PATENT DOCUMENTS

| JP | 2000-241874 A | 9/2000 |
| JP | 2004-015284 A | 1/2004 |
| JP | 2005-351996 A | 12/2005 |
| JP | 2006-013782 A | 1/2006 |
| JP | 2006-146359 A | 8/2006 |
| JP | 2008-040952 A | 2/2008 |
| JP | 2008-180986 A | 8/2008 |
| JP | 2008-310214 A | 12/2008 |
| JP | 2009-049625 A | 3/2009 |
| JP | 2009-098482 A | 5/2009 |
| WO | WO-03-015451 A | 2/2003 |

* cited by examiner

*Primary Examiner* — Daniel Wu
*Assistant Examiner* — Frederick Ott
(74) *Attorney, Agent, or Firm* — AdvantEdge Law Group, LLC (57) ABSTRACT

A projection system includes: a screen having screen specific authentication information; and a projector having a function of acquiring the screen specific authentication information and, based on the acquired authentication information, carrying out an authentication process for setting the projector to a usable condition.

7 Claims, 6 Drawing Sheets

PROJECTION SYSTEM, SCREEN, AND PROJECTOR

CROSS-REFERENCE

The present application claims priority from Japanese Patent Application No. 2008-293067 filed on Nov. 17, 2008, which is hereby incorporated by reference in its entirety.

BACKGROUND

In recent years, a projector has existed which, in order to prevent an illicit use, has a function of carrying out authentication by inputting authentication information such as a code number at the time of use initiation (refer to, for example, Japanese Patent Publication NO. 2000-241874).

The projector disclosed in Japanese Patent Publication NO. 2000-241874 is one which determines whether or not authentication is possible, depending on whether or not a predetermined key operation registered in advance has been carried out after the projector is powered on. According to this, only a user who knows the predetermined key operation can use the projector.

However, the projector disclosed in Japanese Patent Publication NO. 2000-241874 has a problem in that, there also being a case in which the predetermined key operation is learned by a third party, it is impossible to obtain a high level of security. It is also troublesome to carry out the predetermined key operation every time the projector is used, and it may also happen that details of the predetermined key operation are forgotten.

SUMMARY

Various embosiments may provide a projection system, projector, and screen which have a high level of security, and are easy to operate for authentication.

A projection system according to at least one embodiment of the disclosure includes a screen having screen specific authentication information; and a projector having a function of acquiring the screen specific authentication information and, based on the acquired authentication information, carrying out an authentication process for setting the projector to a usable condition.

In the projection system according to at least one embodiment of the disclosure, the projector acquires the screen specific authentication information assigned to the screen, carries out the authentication process based on the acquired authentication information and, only in the event of determining that authentication is possible, attains the usable condition. Consequently, in the projection system of the embodiment, the projector attains the usable condition only in the event of combining a screen having its specific authentication information, and a projector having a function of carrying out the authentication process based on the screen specific authentication information.

For this reason, as the projector does not attain the usable condition, for example, in the event that a third party who is not permitted to use the projector (referred to as an outsider) carries away the projector, and attempts to carry out a projection with a screen whose authentication information does not exist, it is possible to prevent the projector being used by the outsider without permission. In this way, according to the projection system of the embodiment, there will be provided an easy operation for authentication, and a high level of security.

In the projection system according to at least one embodiment of the disclosure, the screen includes an authentication information transmission section which transmits the screen specific authentication information as a wireless signal, and that the projector includes a reception section which receives the authentication information transmitted from the authentication information transmission section, an authentication information storage section in which the authentication information is stored, and a controller which has a function of carrying out a correlation of the authentication information received by the reception section and the authentication information stored in the authentication information storage section, determining based on a result thereof whether or not authentication is possible and, only in the event of determining that authentication is possible, setting the projector to the usable condition.

This is a configuration such that the authentication information transmission section which can transmit the authentication information is provided on the screen side, and the authentication information is transmitted from the screen as a wireless signal, while the authentication information transmitted from the screen side is received, and a correlation of the authentication information received and the authentication information stored in the authentication information storage section is carried out, on the projector side. The correlation of the authentication information received and the authentication information stored in the authentication information storage section is specifically to carry out a determination as to whether or not the two match and, in the event that the two match, it is taken that authentication is possible, while in the event that the two do not match, it is taken that no authentication is possible. By this means, it is possible to carry out an appropriate authentication with a simple operation.

Also, as the authentication information transmission section of the screen, it is also possible to use, for example, a radio frequency identification (RFID) tag, and it is also acceptable to configure in such a way that the RFID tag is attached to the screen SCR side, and the projector PJ is provided with a reception section which receives an electric wave from the RFID tag.

In the projection system according to at least one embodiment of the disclosure, the screen includes an authentication information display section from which the screen specific authentication information can be imaged by an imaging device, and that the projector includes the imaging device, an authentication information storage section in which the authentication information is stored, and a controller which has a function of carrying out a correlation of imaged image information obtained by imaging the authentication information by means of the imaging device and the authentication information stored in the authentication information storage section, determining based on a result thereof whether or not authentication is possible and, only in the event of determining that authentication is possible, setting the projector to the usable condition.

This is a configuration such that the authentication information which can be imaged by the imaging device is provided on the screen side, while the authentication information is acquired from the imaged image information obtained by imaging the authentication information using the imaging device, and a correlation of the acquired authentication information and the authentication information stored in the authentication information storage section (a determination as to whether or not the two match) is carried out, on the projector side. By adopting this kind of configuration, it is sufficient simply to attach the authentication information on the screen side, and in the event that the projector has a built-in imaging device, it is possible to use it on the projector side, meaning that it is possible to configure the projection system having the authentication function at a low cost.

In the projection system according to at least one embodiment of the disclosure, the authentication information which is imaged by the imaging device is a one-dimensional code or a two-dimensional code.

By using code information, such as a one-dimensional code or a two-dimensional code, as the authentication information which is imaged by the imaging device, it is easy to generate the authentication information. As the code information, it is preferable to use a two-dimensional code such as, for example, a quick response (QR) code, and by using this kind of two-dimensional code, it being possible to generate authentication information with a larger amount of information, it is possible to provide a higher level of security.

In the projection system according to at least one embodiment of the disclosure, in the event of using the projector in combination with a plurality of screens, individual items of screen specific authentication information are assigned, and that a plurality of items of authentication information are stored in the authentication information storage section in such a way as to enable a correlation with the individual items of screen specific authentication information.

By this means, it being possible to use one and the same projector in combination with each of a plurality of screens, for example, in a company or the like, by disposing the screens having specific authentication information one in each of a plurality of conference rooms, it is possible to use one and the same projector in any one of the plurality of conference rooms.

A screen according to at least one embodiment of the disclosure is used in combination with a projector which acquires screen specific authentication information, and carries out an authentication process, and includes the screen specific authentication information.

Only in the event of combining this kind of screen and the projector having the function of carrying out the authentication process based on the screen specific authentication information, the projector attains the usable condition. By this means, a projection system having a high level of security can be configured by the screen of the embodiment and the projector having the function of carrying out the authentication process based on the screen specific authentication information. The screen of the embodiment also has each feature which the projection system of the heretofore described embodiment has.

A projector according to at least one embodiment of the disclosure is used in combination with a screen having screen specific authentication information, including a function of acquiring the screen specific authentication information and, based on the acquired authentication information, carrying out an authentication process for setting the projector to a usable condition.

Only in the event of combining this kind of projector and a screen having screen specific authentication information, the projector attains the usable condition. By this means, a projection system having a high level of security can be configured by the projector of the embodiment and the screen assigned with the screen specific authentication information. The projector of the embodiment also has each feature which the projection system of the heretofore described embodiment has.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Hereafter, a description will be given, referring to the drawings, of embodiments of the disclosure.

Embodiment 1

Figure 1:
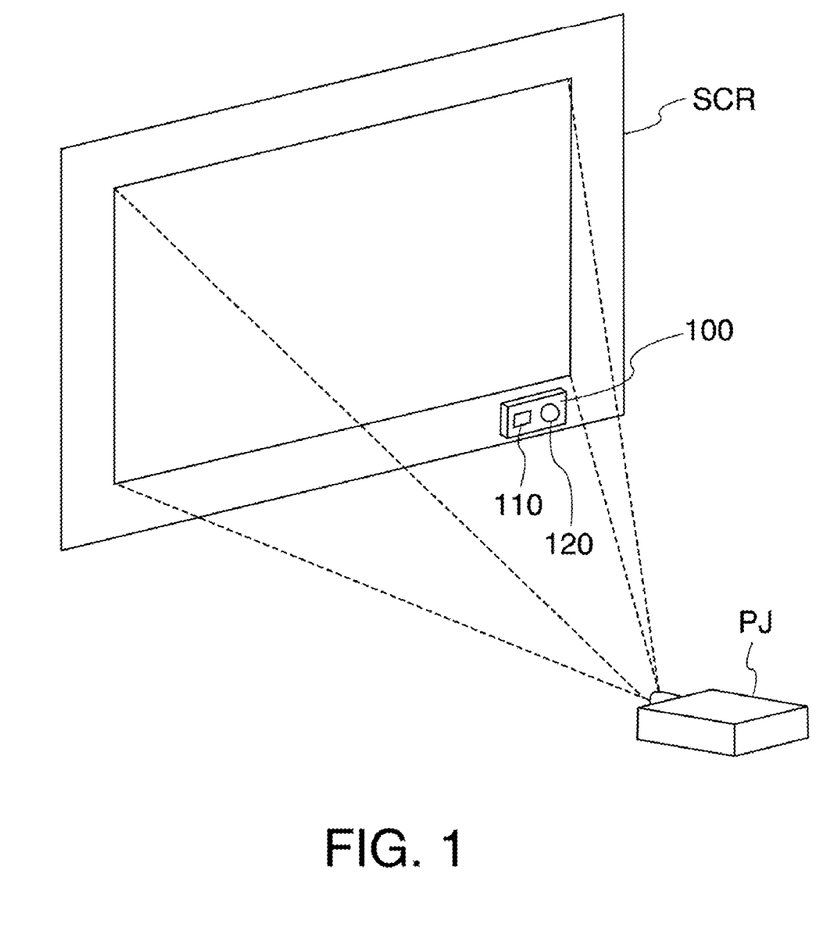
FIG. 1 shows an outline configuration of a projection system according to Embodiment 1.

FIG. 1 shows a configuration of a projection system according to Embodiment 1. The projection system according to Embodiment 1 includes a screen SCR and a projector PJ, as shown in FIG. 1. The screen SCR includes an authentication information transmission section 100. Also, the projector PJ has a function of acquiring screen specific authentication information transmitted from the authentication information transmission section 100 of the screen SCR, and carrying out an authentication process for setting the projector PJ to a usable condition (referred to as a normal use mode). The authentication information transmission section 100 is provided outside a range, on a surface of the screen SCR, in which an image projected from the projector PJ is projected.

The authentication information transmission section 100 provided on the screen SCR includes a wireless signal transmission section 110 which transmits the authentication information to the exterior as a wireless signal of infrared rays or the like, and a push button 120 for transmitting the authentication information. In the projection system according to Embodiment 1, and to Embodiment 2, to be described hereafter, it is supposed that the screen SCR is a fixed screen.

Figure 2:
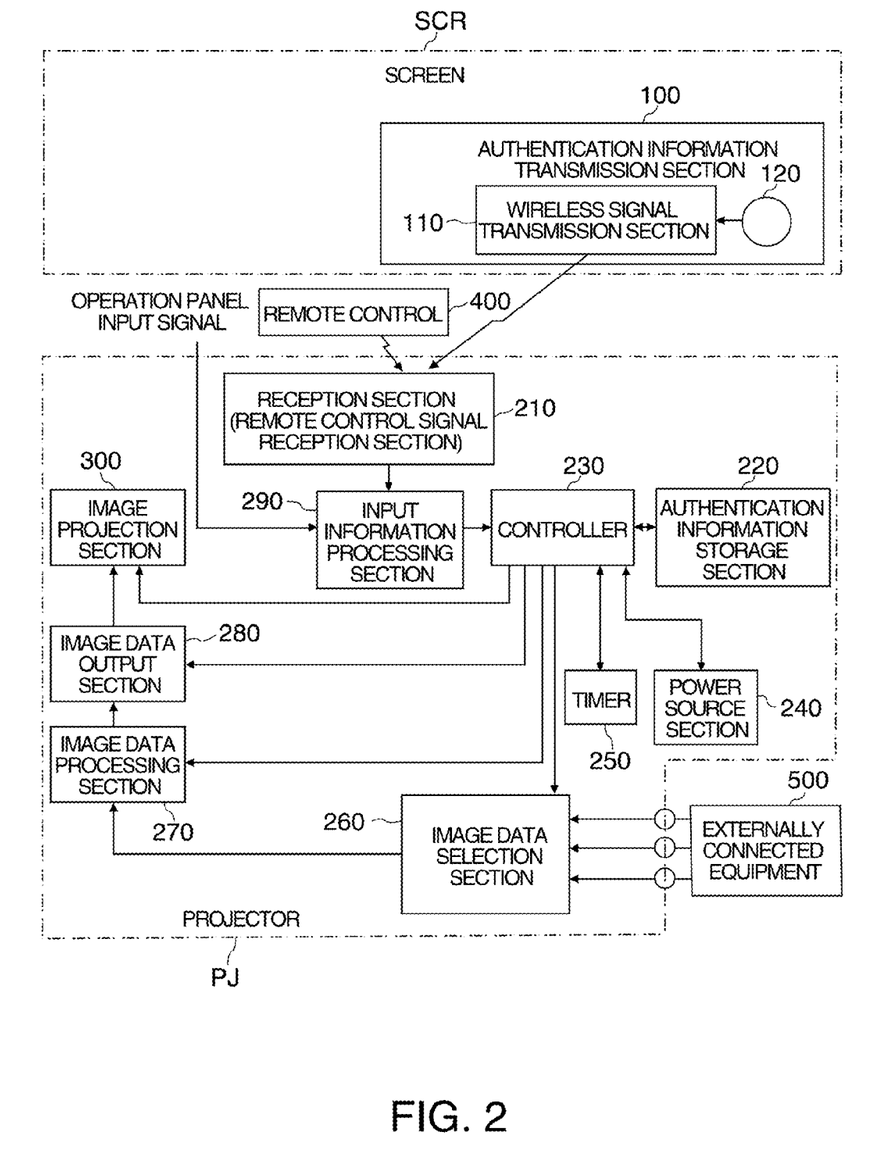
FIG. 2 is a functional block diagram of the projection system according to Embodiment 1.

FIG. 2 is a functional block diagram of the projection system according to Embodiment 1. As shown in FIG. 2, the screen SCR includes the authentication information transmission section 100. Also, the projector PJ includes a reception section 210 which receives the authentication information transmitted from the authentication information transmission section 100 of the screen SCR, an authentication information storage section 220 in which is stored authentication information for carrying out a correlation with the screen specific authentication information, and a controller 230 which has a function (referred to as an authentication processing function) of determining whether or not authentication is possible, based on the authentication information received by the reception section 210, and on the authentication information stored in the authentication information storage section 220, and setting the projector PJ to the normal use mode only in the event of determining that authentication is possible.

As the reception section 210 which receives the authentication information, it is possible to use a remote control signal reception section which receives an instruction signal from a remote control 400 originally included in the projector PJ.

Consequently, the reception section 210 will be referred to hereafter as the remote control signal reception section 210.

Also, the projector PJ includes a power source section 240 which, being connected to a commercial power source (normally, 100 volts), gives electric power for operating the projector PJ to each section of the projector PJ, a timer 250 which measures time, an image data selection section 260 which selects image data from externally connected equipment 500, an image data processing section 270 which processes the image data selected by the image data selection section 260, an image data output section 280 which outputs the image data processed by the image data processing section 270 to an image projection section 300, an input information processing section 290 which processes various kinds of information, such as the remote control instruction signal, an operation panel input signal input by a user operating an operation panel (not shown) provided on a projector PJ main body, and the authentication information transmitted from the screen SCR.

Also, a plurality of items of authentication information corresponding to items of screen specific authentication information assigned one to each of a plurality of screens SCR are stored in the authentication information storage section 220. This is for configuring in such a way that the projector PJ can be used in combination with each of the plurality of screens.

For example, in the event of configuring in such a way that the projector PJ can be used in combination with each of three screens (a first screen SCR1, a second screen SCR2, and a third screen SCR3), respective items of authentication information assigned to the first to third screens SCR1 to SCR3 are stored in the authentication information storage section 220 of the projector PJ. That is, supposing that first authentication information is assigned to the first screen SCR1, second authentication information is assigned to the second screen SCR2, and third authentication information is assigned to the third screen SCR3, the first to third authentication information assigned to the first to third screens SCR1 to SCR3 are stored in the authentication information storage section 220 of the projector PJ.

In order to configure in such away that the projector PJ can be used in combination with the plurality of screens in this way, it is necessary to store the authentication information assigned to each screen in the authentication information storage section 220 of the projector PJ, but in this case, it is preferable to limit users who can store the authentication information assigned to each screen in the relevant projector PJ.

For example, in the event of, the projector PJ having the authentication function already set in combination with one screen (taken to be the first screen SCR1), attempting to carry out a setting of the authentication function in combination with other screens (taken to be the second screen SCR2 and third screen SCR3) too, it is necessary to store a set of the authentication information of the second screen SCR2 and the authentication information of the third screen SCR3 in the projector PJ.

In this case, in the projector PJ, a configuration is such that a user firstly sets an authentication information acquisition menu for acquiring authentication information of a screen, inputs personal authentication information, such as a password, into the authentication information acquisition menu and, only in the event that the input personal authentication information is authenticated, can acquire the authentication information from the screen, and store it in the authentication information storage section of the projector PJ. By this means, only an authenticated user can use the projector PJ in combination with a plurality of specified screens.

Also, the controller 230 has, apart from the heretofore described kind of authentication processing function, various control functions, such as a control function compatible with the remote control instruction signal, operation panel input signal, and the like processed by the input information processing section 290, a function of controlling the image data processing section 270 and image data output section 280, and a function of controlling a light source (refer to FIG. 3) of the image projection section 300.

Also, the authentication function carried out by the controller 230 being one which carries out a correlation of the authentication information received by the remote control reception section 210 and the authentication information stored in the authentication information storage section 220 (a determination as to whether or not the two match), in the event that the two match, it is taken that authentication is possible, while in the event that the two do not match, it is taken that no authentication is possible, and in the event that authentication is possible, a setting to the normal use mode is carried out.

Figure 3:
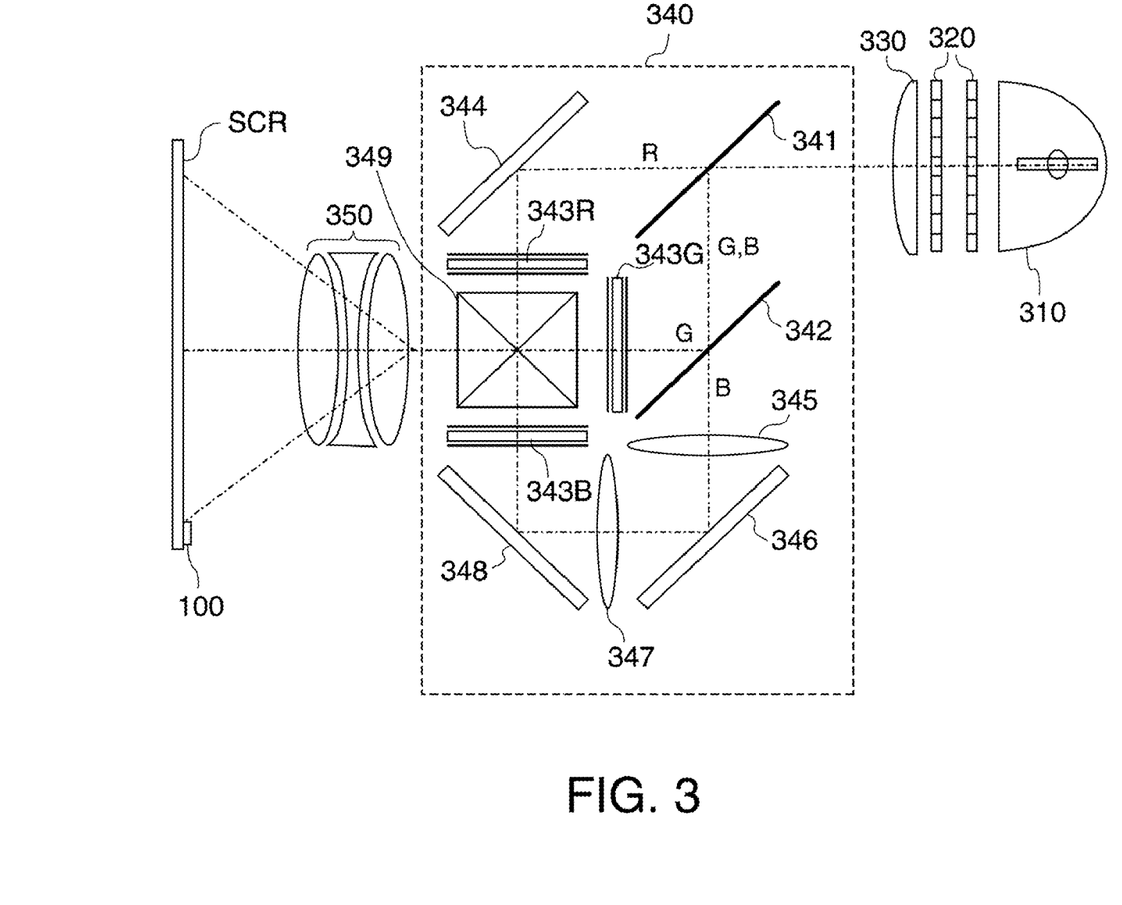
FIG. 3 is a diagram showing a configuration of an image projection section 300 shown in FIG. 2.

FIG. 3 is a diagram showing a configuration of the image projection section 300 shown in FIG. 2. The image projection section 300, as shown in FIG. 3, includes the light source 310 which emits light including a red light, a green light, and a blue light, a lens array 320, a superimposing lens 330, an image forming unit 340, and a projection lens 350.

The image forming unit 340 includes a first dichroic mirror 341 which separates the light emitted from the light source 310 into the red light R, and the green light G and blue light B, a second dichroic mirror 342 which separates the green light and blue light separated by the first dichroic mirror 341 into the green light and the blue light, an optical modulator 343R for the red light, optical modulator 343G for the green light, and optical modulator 343B for the blue light which modulate the respective color lights—the red light, green light, and blue light—based on the image data output from the image data output section 280 shown in FIG. 1, a reflecting mirror 344 which leads the red light transmitted through the first dichroic mirror 341 to the optical modulator 343R, a first relay lens 345 which leads the blue light transmitted through the second dichroic mirror 342 to the optical modulator 343B, a first reflecting mirror 346, a second relay lens 347, a second reflecting mirror 348, and a cross dichroic prism 349 which synthesizes image lights formed of the individual color lights modulated one each by the optical modulators 343R, 343G, and 343B, forming a color image light.

The projection lens 350 magnifies and projects the color image light synthesized by the cross dichroic prism 349 onto the screen SCR.

A description will be given, referring to the flowchart of FIG. 4, of an authentication process in the projector according to Embodiment 1 configured in the way heretofore described. The flowchart shown in FIG. 4 is of an authentication process carried out by the controller 230.

Figure 4:
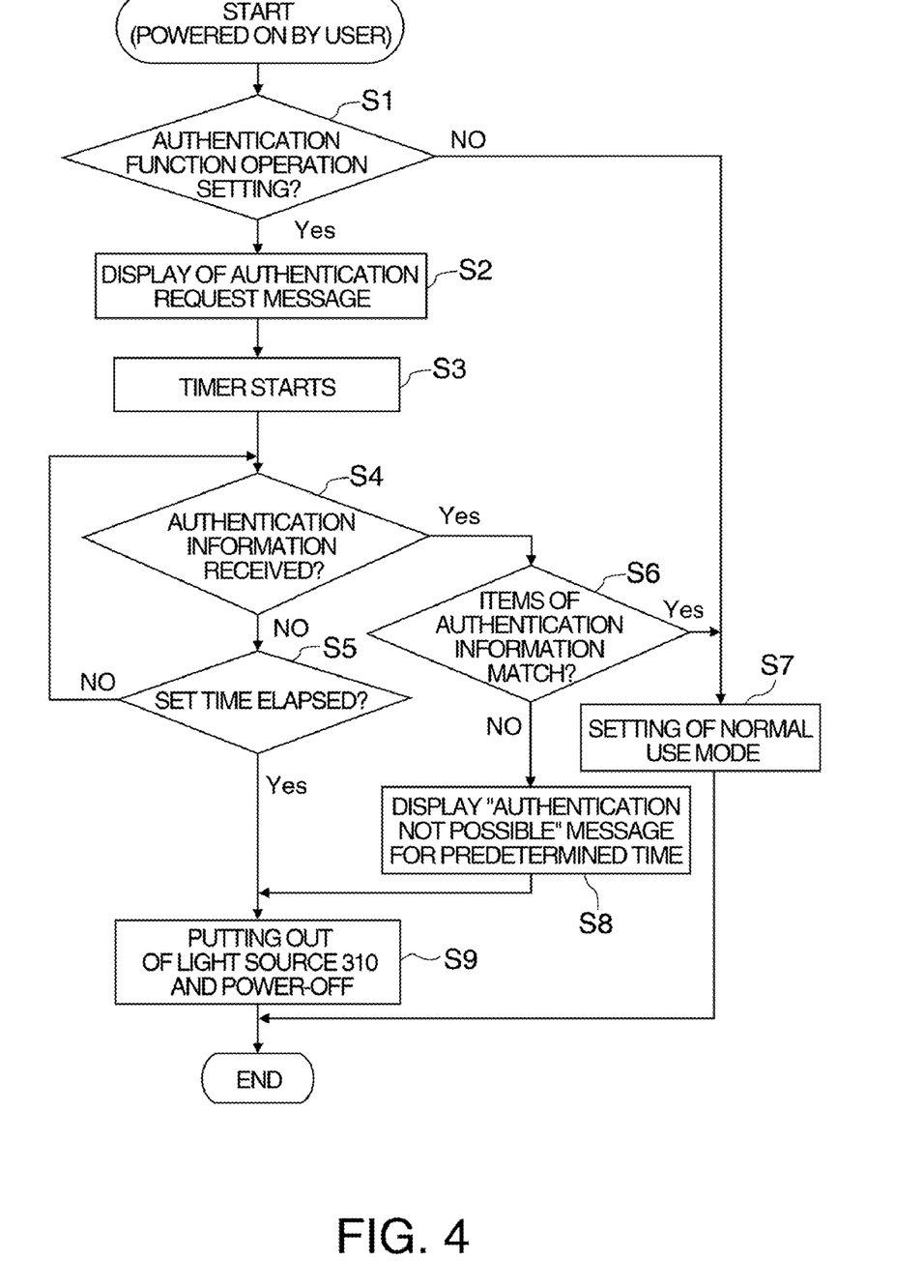
FIG. 4 is a flowchart illustrating an authentication process in the projection system according to Embodiment 1.

FIG. 4 is a flowchart illustrating an authentication process in the projection system according to Embodiment 1. Firstly, on the projector being powered on by a user, the controller 230 determines whether or not the authentication processing function is set to operate (referred to as an authentication function operation setting) (step S1). The projector PJ is configured so that, on its being powered on by the user, firstly, the authentication processing function operates unless the authentication function operation setting is intentionally cancelled. Also, the projector PJ at this time attains a condition in which the light source 310 is lighted, and attains a condition in which it is possible to carry out a predetermined display (a display for carrying out the authentication process), but does not attain the normal use mode.

Then, as a result of determining whether or not the authentication function operation setting is made, if the authentication function operation setting is made, the controller 230 carries out a control for displaying an authentication request message on the screen SCR (step S2). By this means, an authentication request message such as, for example, "press push button" is displayed on the screen SCR. Herein, on the user pressing the push button 120 of the authentication information transmission section 100 provided on the screen SCR, screen SCR specific authentication information is transmitted from the wireless signal transmission section 110.

Meanwhile, in the projector, the controller 230 causes the timer 250 to start (step S3), starting a measurement of a set time (referred to as a set time). Then, the controller 230 monitors whether or not authentication information is received before the set time elapses (steps S4 and S5) and, if authentication information is received before the set time elapses, determines whether or not the authentication information received matches any one of the plurality of items of authentication information stored in the authentication information storage section 220 (step S6). As a result of the determination, if the authentication information received matches any one of the plurality of items of authentication information stored in the authentication information storage section 220, the controller 230, taking it that authentication is possible, sets the normal use mode (step S7). In the normal use mode, it is possible to normally use the projector PJ, and it is possible to project, for example, an image based on the image data input from the externally connected equipment 500.

Meanwhile if, as a result of the determination in step S6, the authentication information received does not match any one of the plurality of items of authentication information stored in the authentication information storage section 220, an "authentication not possible" message indicating to the user that no authentication is possible is displayed on the screen SCR for a predetermined time (step S8) and after that, when the predetermined time elapses, as well as the light source 310 being put out, the power source section 240 is deactivated (step S9). Also, if no authentication information has been received within the set time of the timer 250 in steps S4 and S5, that is, if the set time elapses (the time runs out) too, as well as the light source 310 being put out, the power source section 240 is deactivated (powered off) (step S9).

As heretofore described, according to the projection system according to Embodiment 1, the screen SCR and projector PJ are handled as one pair, enabling the projector PJ to be normally used only with the paired screen SCR. That is, a configuration is such that authentication information is transmitted from the screen SCR, the authentication information is received in the projector PJ and, only in the event that the authentication information received matches the authentication information (any one of the plurality of items of authentication information) stored in the authentication information storage section 220, the projector PJ is set to the normal use mode.

By this means, for example, even in the event that an outsider who is not permitted to use the projector PJ carries away the projector PJ, and attempts to carry out a projection using a common screen with no authentication information, as the authentication processing function itself does not operate, the relevant projector does not attain the normal use mode, and it is impossible to use the projector PJ. Consequently, this kind of projector PJ having the authentication processing function also has an advantage of preventing a theft from occurring.

In the projection system according to Embodiment 1, as the plurality of items of authentication information assigned one to each of the plurality of screens are stored in the authentication information storage section 220, the projector PJ can be used in combination with each of the plurality of screens. By this means, for example, in the event that screens are disposed fixed in a plurality of conference rooms, and one and the same projector is used in each conference room, by authentication information assigned to each screen disposed in each conference room being stored in the one and the same projector PJ, it is possible to use the relevant projector PJ in any conference room.

Also, in the event that a user who is permitted to use the projector PJ (referred to as a legitimate user) has a need to carry out a projection with the projector PJ using a screen assigned with no authentication information, by canceling the authentication function operation setting, it is also possible to set the normal use mode without operating the authentication processing function. In this case, if a result of determining in step S1 whether or not the authentication function operation setting is made is that the authentication function operation setting is not made, the process procedure in FIG. 4 will be a process procedure of setting the normal use mode (step S7). When canceling the authentication function operation setting, it is preferable to configure in such a way that, by inputting a code number or the like assigned to only the legitimate user, it is possible, after determining whether or not the code number is legitimate, to cancel the authentication function operation setting.

In this way, in the projection system according to Embodiment 1, a configuration is such that the projector PJ and screen SCR are used as one combination and, by the push button 120 provided on the screen SCR being pressed, authentication information is transmitted from the screen SCR, and that the authentication information transmitted from the screen SCR is received on the projector side, and authentication is carried out by matching it with the authentication information stored in the authentication information storage section 220. By this means, with the projection system according to Embodiment 1, it being possible to save a user the trouble of inputting authentication information each time, it is possible to provide a projection system which is superior in user friendliness, and can obtain a high level of security.

Embodiment 2

Figure 5:
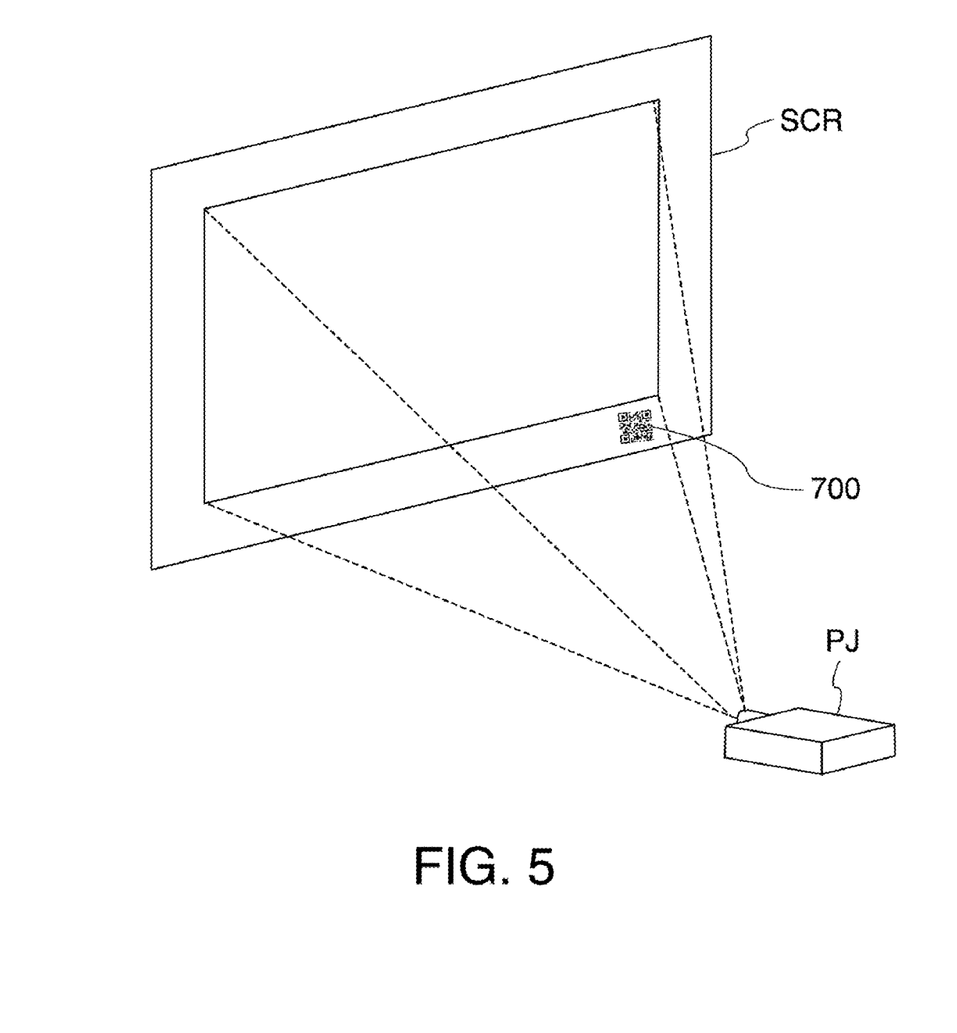
FIG. 5 shows an outline configuration of a projection system according to Embodiment 2.

FIG. 5 shows an external configuration of a projection system according to Embodiment 2. In the projection system according to Embodiment 2, an authentication information display section 800 on which is displayed authentication information 700, such as a two-dimensional code, which can be imaged by an imaging device is provided on a screen SCR, the authentication information 700 provided on the screen SCR is imaged by an imaging device 600 (refer to FIG. 6) provided in a projector PJ, a correlation of imaged image information obtained thereby and authentication information stored in an authentication information storage section 220 is carried out, and it is determined, based on a result thereof, whether or not authentication is possible.

Specifically, screen SCR specific authentication information is acquired from the imaged image information, a correlation of the acquired screen SCR specific authentication information and the authentication information stored in the authentication information storage section 220 is carried out, and it is determined, based on a result thereof, whether or not authentication is possible. The authentication information display section 800 is provided outside a range, on a surface of the screen SCR, in which is projected an image projected from the projector PJ. Also, the authentication information 700 is provided, for example, in a condition in which it is attached within the authentication information display section 800.

A case of using a quick response (QR) code which is one kind of two-dimensional code, or the like, as the authentication information which can be imaged by the imaging device 600 is illustrated as an example in the projection system according to Embodiment 2. By using a two-dimensional code such as the QR code as the authentication information 700, it being possible to generate authentication information with a large amount of information, it is possible to provide a higher level of security.

Figure 6:
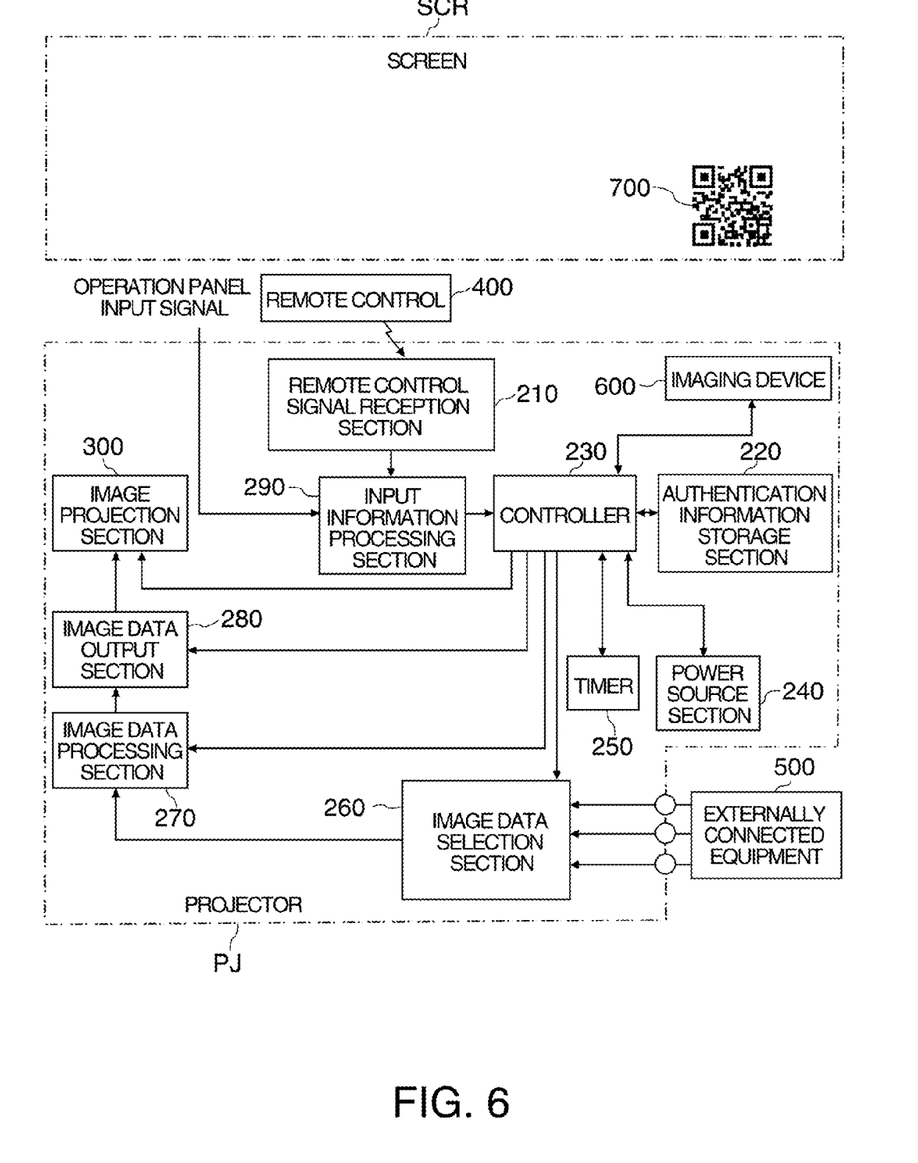
FIG. 6 is a functional block diagram of the projection system according to Embodiment 2.

FIG. 6 is a functional block diagram of the projection system according to Embodiment 2. In FIG. 6, identical reference numerals and characters are appended to components identical to those in FIG. 2. As described in FIG. 5, the projection system according to Embodiment 2 carries out a correlation of the imaged image information obtained by imaging the authentication information 700 (referred to as the two-dimensional code 700) attached to the screen SCR by means of the imaging device 600 and the authentication information stored in the authentication information storage section 220, and determines, based on a result thereof, whether or not authentication is possible. As for the imaging device 600, in the event that the projector PJ has a built-in imaging device, it is possible to use it, but in the event that the projector PJ has no built-in imaging device, it is sufficient that an imaging device is installed in such a way that it is possible to image the two-dimensional code 700 of the screen SCR.

Also, an authentication information process carried out by a controller 230 can be carried out according to the same procedure as that of the flowchart shown in FIG. 4. In the case of the projection system according to Embodiment 2, as the authentication information of the screen SCR is acquired from the imaged image information obtained by imaging it using the imaging device 600 of the projector PJ, the process of determining in step S4 of FIG. 4 whether or not authentication information has been received is a process of determining whether or not authentication information has been acquired from the imaged image information output from the imaging device 600. A process after authentication information has been acquired from the imaged image information is the same as that in FIG. 4. That is, a correlation of the authentication information acquired from the imaged image information and the authentication information stored in the authentication information storage section 220 (a determination as to whether or not the two match) is carried out, it is determined, based on a result thereof, whether or not authentication is possible and, only in the event that it is determined that authentication is possible, the projector PJ is set to the normal use mode.

In the projection system according to Embodiment 2 too, in the same way as in the projection system according to Embodiment 1, it is possible to use the projector PJ only with a screen having the authentication information. Also, in Embodiment 2, as it is sufficient that the kind of two-dimensional code 700 or the like which can be imaged by the imaging device 600 of the projector PJ is attached to the screen SCR, it is possible to simplify the configuration of the screen SCR.

The embodiment, not being limited to each heretofore described embodiment, is capable of various modification embodiments without departing from the scope of the disclosure. For example, modification embodiments shown in 1 to 3 described hereafter are also possible.

1. In Embodiment 1, as the authentication information transmission section 100, it is also possible to use a radio frequency identification (RFID) tag. In the event of using the RFID tag as the authentication information transmission section 100, by the RFID tag being attached to the screen SCR, and the projector PJ being provided with a reception section which can receive an electric wave from the RFID tag, it is possible to recognize the RFID tag of the screen SCR with the projector PJ. Then, by determining a match of authentication information written into the RFID tag and the authentication information stored in the authentication information storage section 220, it is possible to determine whether or not authentication is possible. By using the RFID tag as the authentication information transmission section 100 in this way, it is sufficient to only attach the RFID tag to the screen SCR, and it is possible to eliminate a need for an operation such as an operation of a push button. In this case, on the projector PJ side, a configuration is adopted such as to include an electric power transmission section for transmitting electric power to the RFID tag.

2. In Embodiment 2, the case of using a two-dimensional code such as the QR code as the authentication information assigned to the screen SCR is illustrated as an example but, without being limited to the two-dimensional code, it is also acceptable to use a one-dimensional code.

3. The projector according to some embodiments not being limited to one using a liquid crystal as the optical modulator, it is also acceptable that it is a projector using a digital mirror device.

What is claimed is:

1. A projection system comprising:
   a screen having screen specific authentication information; and
   a projector having a function of wirelessly acquiring the screen specific authentication information and, based on the acquired screen specific authentication information, carrying out an authentication process for setting the projector to a usable condition, the projector including:
      an authentication information storage section in which a plurality of items of authentication information are stored, and
      a controller that:
         determines whether the screen specific authentication information acquired from the screen matches at least one of the plurality of items of authentication information stored in the authentication information storage section, and
         sets the projector to the usable condition only in the event that the screen specific authentication information acquired from the screen is determined to match at least one of the plurality of items of authentication information stored in the authentication information storage section.

2. The projection system according to claim 1, wherein the screen includes an authentication information transmission section which transmits the screen specific authentication information as a wireless signal, and the projector includes
   a reception section which receives the screen specific authentication information transmitted from the authentication information transmission section.

3. The projection system according to claim 1, wherein the screen includes an authentication information display section from which an imaging device images the screen specific authentication information, and the projector includes
   the imaging device, the screen specific authentication information being acquired from the screen by imaging by means of the imaging device.

4. The projection system according to claim 3, wherein the authentication information which is imaged by the imaging device is a one-dimensional code or a two-dimensional code.

5. The projection system according to claim 1, wherein
in the event of using the projector in combination with a plurality of screens each having an individual item of screen specific authentication information, the individual items of screen specific authentication information are assigned, and
the plurality of items of authentication information stored in the authentication information storage section are stored in such a way as to enable a correlation with the individual items of screen specific authentication information.

6. A screen used in combination with a projector having an authentication information storage section in which a plurality of items of authentication information are stored and which wirelessly acquires screen specific authentication information from the screen, and carries out an authentication process, the screen comprising:
the screen specific authentication information that matches at least one of the plurality of items of authentication information stored in the authentication information storage section of the projector.

7. A projector used in combination with a screen having screen specific authentication information, the projector comprising:
a function of wirelessly acquiring the screen specific authentication information and, based on the acquired screen specific authentication information, carrying out an authentication process for setting the projector to a usable condition, the projector including:
an authentication information storage section in which a plurality of items of authentication information are stored, and
a controller that:
determines whether the screen specific authentication information acquired from the screen matches at least one of the plurality of items of authentication information stored in the authentication information storage section, and
sets the projector to the usable condition only in the event that the screen specific authentication information acquired from the screen is determined to match at least one of the plurality of items of authentication information stored in the authentication information storage section.

* * * * *